United States Patent
Marinov

(10) Patent No.: US 10,707,459 B2
(45) Date of Patent: Jul. 7, 2020

(54) TRANSPORTATION SAFE BATTERY

(71) Applicants: Robert Bosch Tool Corporation, Broadview, IL (US); Robert Bosch GmbH, Stuttgart (DE)

(72) Inventor: Plamen Marinov, Mount Prospect, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/655,261

(22) Filed: Jul. 20, 2017

(65) Prior Publication Data
US 2019/0027718 A1    Jan. 24, 2019

(51) Int. Cl.
*H01M 2/10* (2006.01)
*H01M 2/30* (2006.01)
*H01M 2/20* (2006.01)
*H01M 2/02* (2006.01)
*H01M 2/06* (2006.01)
*H01M 10/052* (2010.01)
*B25F 5/02* (2006.01)

(52) U.S. Cl.
CPC .......... *H01M 2/1022* (2013.01); *B25F 5/024* (2013.01); *H01M 2/0202* (2013.01); *H01M 2/06* (2013.01); *H01M 2/1011* (2013.01); *H01M 2/20* (2013.01); *H01M 2/204* (2013.01); *H01M 2/30* (2013.01); *H01M 10/052* (2013.01)

(58) Field of Classification Search
CPC . H01M 2/02–0202; H01M 2/10–1027; H01M 2/20–204; H01M 10/42; H01M 10/425–4257
See application file for complete search history.

(56) References Cited

U.S. PATENT DOCUMENTS

| | | | |
|---|---|---|---|
| 6,729,413 B2 * | 5/2004 | Turner | H01M 2/1022 173/217 |
| 9,050,715 B2 | 6/2015 | Umemura et al. | |
| 9,583,745 B2 | 2/2017 | White et al. | |
| 2004/0257038 A1 * | 12/2004 | Johnson | H01M 2/1055 320/116 |

(Continued)

FOREIGN PATENT DOCUMENTS

WO    2016/093979 A1    6/2016

*Primary Examiner* — Jonathan G Leong
*Assistant Examiner* — Jacob Buchanan
(74) *Attorney, Agent, or Firm* — Maginot, Moore & Beck LLP

(57) ABSTRACT

A battery includes a housing, a plurality of battery cells, a first part, and a second part. The plurality of battery cells is disposed in the housing. The first part includes a first contact. The first contact has a first connection to at least one battery cell of the plurality of battery cells. The second part includes a second contact. The second contact has a second connection to at least one battery cell of the plurality of battery cells. The second part is movable to a first position to provide electrical separation between the second contact and the first contact such that the plurality of battery cells is disconnected from each other. In addition, the second part is movable to a second position to provide electrical connection between the second contact and the first contact such that the plurality of battery cells is connected to each other.

17 Claims, 7 Drawing Sheets

(56) References Cited

U.S. PATENT DOCUMENTS

| | | | |
|---|---|---|---|
| 2006/0268504 A1* | 11/2006 | Shimizu | B25F 5/02 |
| | | | 439/155 |
| 2007/0247112 A1 | 10/2007 | Yu et al. | |
| 2008/0213652 A1 | 9/2008 | Scheucher | |
| 2009/0184682 A1 | 7/2009 | Kosugi et al. | |
| 2010/0181966 A1* | 7/2010 | Sakakibara | H01M 10/441 |
| | | | 320/136 |
| 2011/0012560 A1* | 1/2011 | Sakakibara | H01M 10/441 |
| | | | 320/118 |
| 2013/0071703 A1 | 3/2013 | Traczek et al. | |
| 2016/0072106 A1 | 3/2016 | Baumgartner et al. | |
| 2016/0126533 A1* | 5/2016 | Velderman | H01M 10/425 |
| | | | 429/97 |
| 2017/0104243 A1 | 4/2017 | Velderman et al. | |

* cited by examiner

TRANSPORTATION SAFE BATTERY

FIELD OF THE INVENTION

This disclosure relates to a battery.

BACKGROUND

Various common electrical devices require batteries with relatively high energy capacities. However, these types of batteries are considered dangerous to transport. For example, with regard to air shipments, lithium batteries with energy capacities over 100 WAh need to be packaged and labeled in a manner that satisfies regulations relating to the transport of dangerous goods due to risks associated with short-circuits or inadvertent activations. Accordingly, transporting these types of batteries in a safe and compliant manner for air shipments is often costly.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a battery includes a housing, a plurality of battery cells, a first part, and a second part. The plurality of battery cells is disposed in the housing. The first part includes a first contact. The first contact has a first connection to at least one battery cell of the plurality of battery cells. The second part includes a second contact. The second contact has a second connection to at least one battery cell of the plurality of battery cells. The second part is movable to a first position to provide electrical separation between the second contact and the first contact such that the plurality of battery cells is disconnected from each other. In addition, the second part is movable to a second position to provide electrical connection between the second contact and the first contact such that the plurality of battery cells is connected to each other.

In an example embodiment, an apparatus includes an electrical device and a battery. The battery is electrically connected to the electrical device. The battery includes a housing, a plurality of battery cells, a first part, and a second part. The plurality of battery cells is disposed in the housing. The first part includes a first contact. The first contact has a first connection to at least one battery cell of the plurality of battery cells. The second part includes a second contact. The second contact has a second connection to at least one battery cell of the plurality of battery cells. The second part is movable to a first position to provide electrical separation between the second contact and the first contact such that the plurality of battery cells is disconnected from each other. In addition, the second part is movable to a second position to provide electrical connection between the second contact and the first contact such that the plurality of battery cells is connected to each other.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
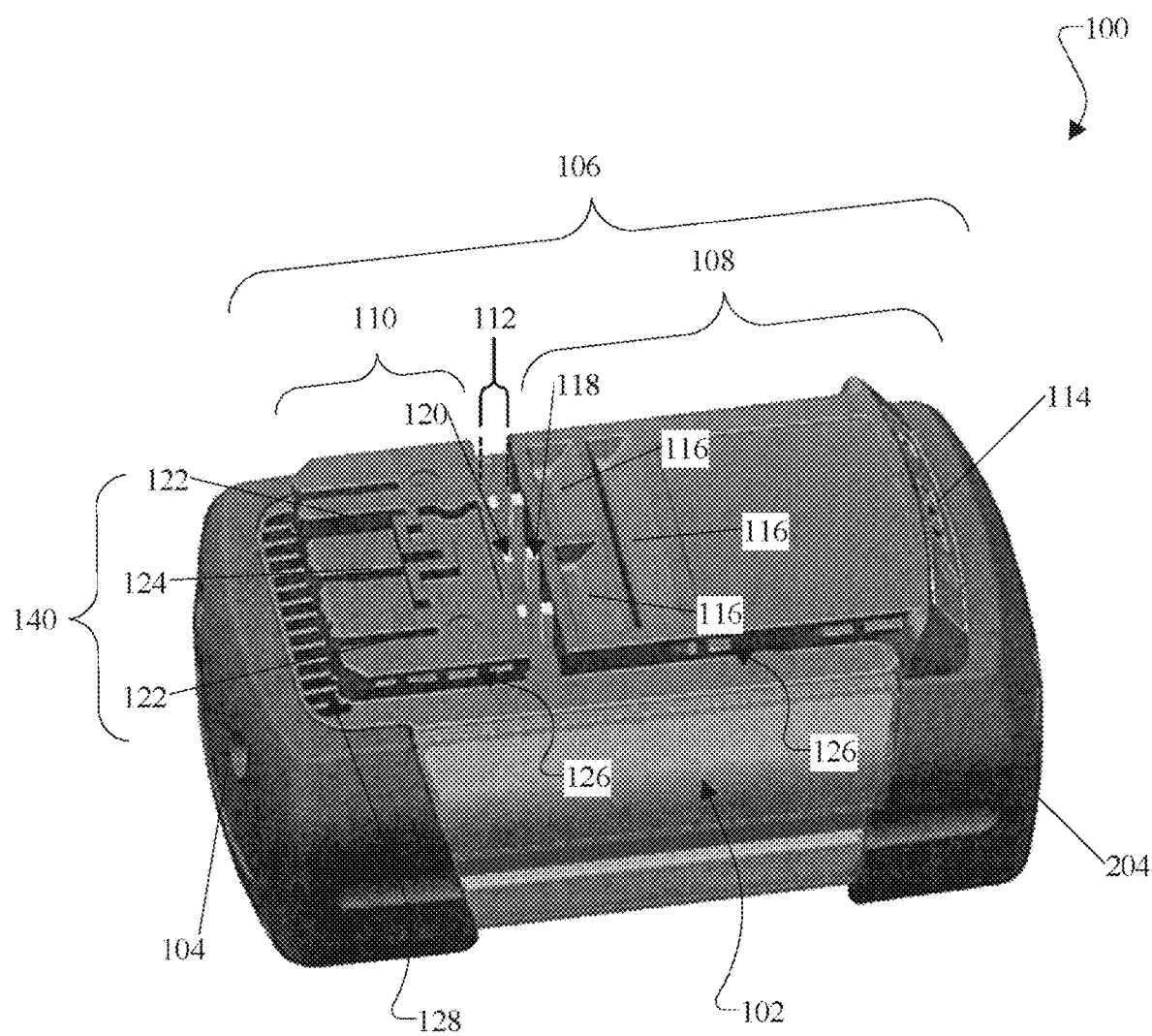
FIG. 1 is a perspective view of a battery according to an example embodiment of this disclosure.
Figure 2:
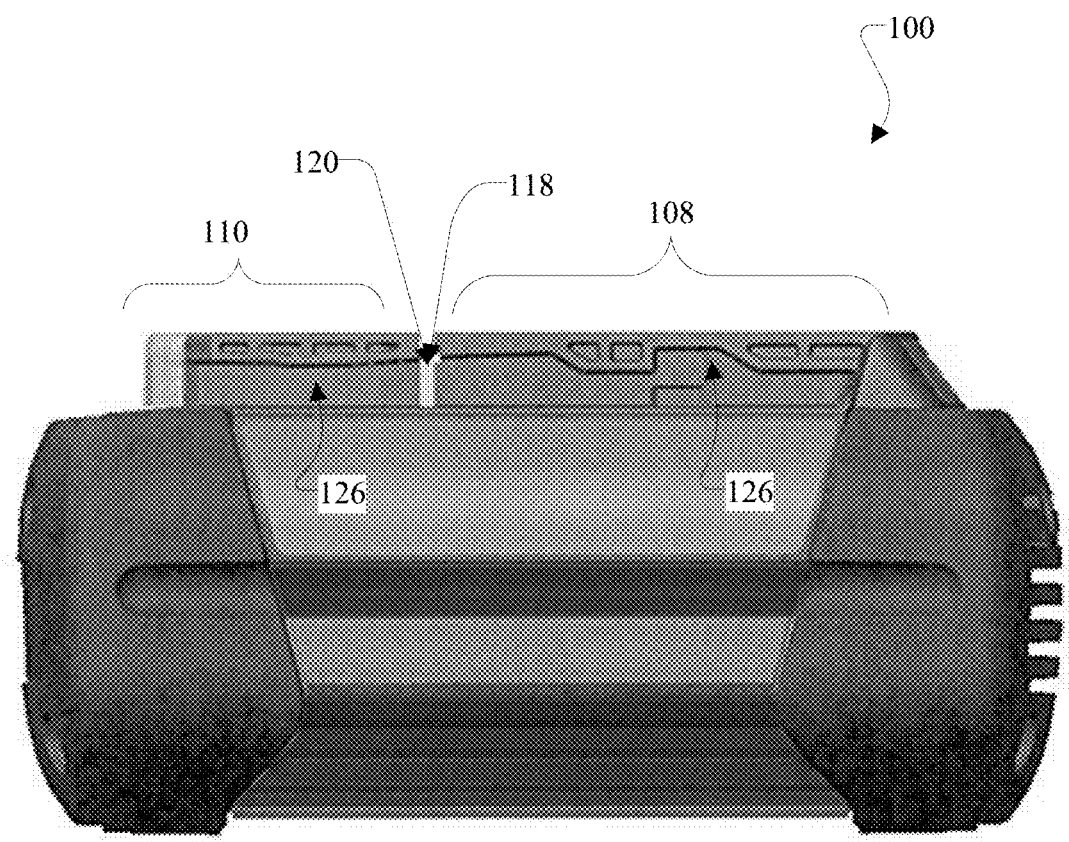
FIG. 2 is a side view of a battery according to an example embodiment of this disclosure.
Figure 3:
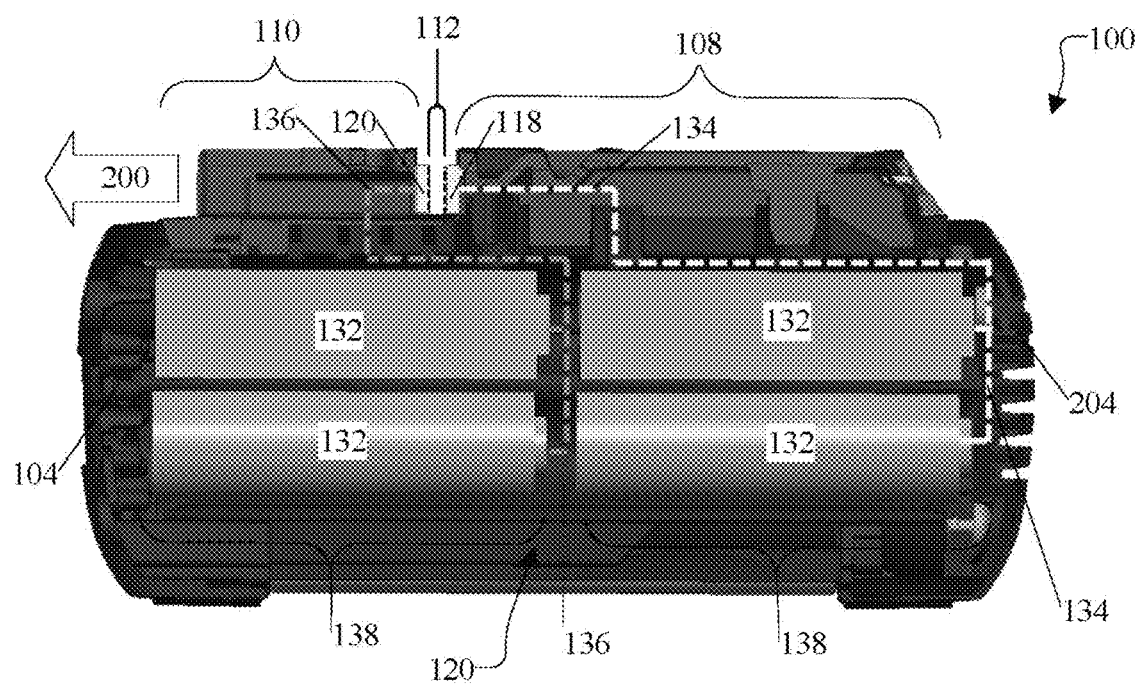
FIG. 3 is a cross-sectional view of a side of a battery in a first state in which the battery modules are disconnected from each other according to an example embodiment of this disclosure.
Figure 4:
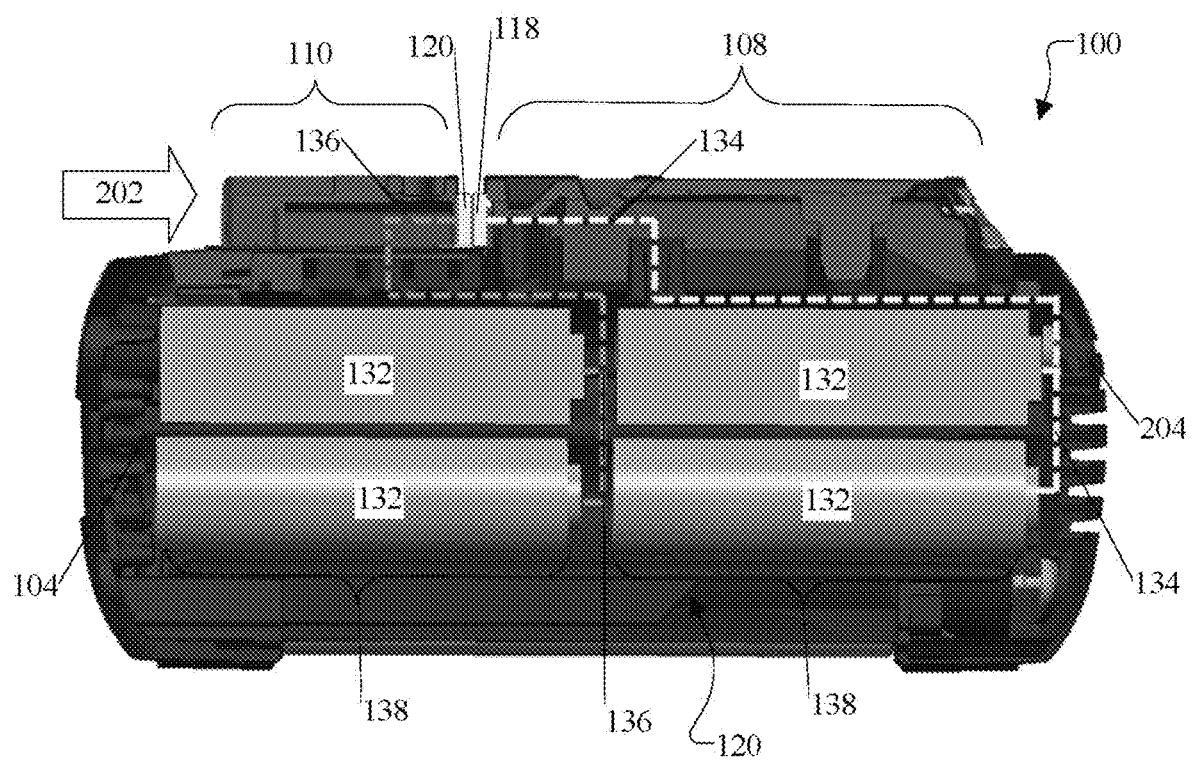
FIG. 4 is a cross-sectional view of a side of a battery in a second state in which the battery modules are connected to each other according to an example embodiment of this disclosure.

FIGS. 1 and 2 are perspective and side views of a battery 100 according to an example embodiment. In an example embodiment, the battery 100 is a rechargeable or secondary battery. In an example embodiment, the battery 100 is a battery pack. In an example embodiment, the battery 100 includes a plurality of battery cells 132, as shown in FIGS. 3-4. In addition, the battery 100 includes a housing 102. In an example embodiment, the housing 102 can be a heat-conductive structure, which is configured to maintain a suitable internal temperature for the plurality of battery cells 132. Also, in an example embodiment, the housing 102 can include vents 128 to release heat and provide a cooling effect such that a suitable internal temperature for the plurality of battery cells 132 can be maintained. In this regard, the vents 128 can be provided on any suitable location of the housing 102. For example, in FIG. 1, the vents 128 are provided on a top or upper portion of the housing 102.

In an example embodiment, the housing 102 is structured to house the plurality of battery cells 132. In addition, the housing 102 is configured to include and/or house other battery components. For example, these other battery components can include a battery monitoring module, as well as any battery elements that are required or desired for the battery 100. In an example embodiment, the battery monitoring module includes at least a circuit and/or electronic components. The battery monitoring module is configured to collect battery status information (e.g., voltage, temperature, current, etc.) relating to each battery cell 132, each battery module 138, the battery 100 itself, or any combination thereof. In an example embodiment, the housing 102 is configured to contain the plurality of battery cells 132 and other battery components in any suitable arrangement. In this regard, the housing 102 is configured to protect the plurality of battery cells 132 and/or other battery components from various external factors.

In an example embodiment, the battery 100 can include at least one protective cap 104 to cover and protect at least one side of the housing 102 and/or battery 100. For example, in an example embodiment, the battery 100 includes a protective cap 204 at a front side of the housing 102 and a protective cap 104 at a rear side of the housing 102. With this arrangement, as shown in FIG. 1, the protective caps 104, 204 are at opposite sides of the battery 100. Also, in an example embodiment, the protective caps 104, 204 are structured to cover the corners of the battery 100 to enhance the structural integrity of the battery 100.

Figure 6:
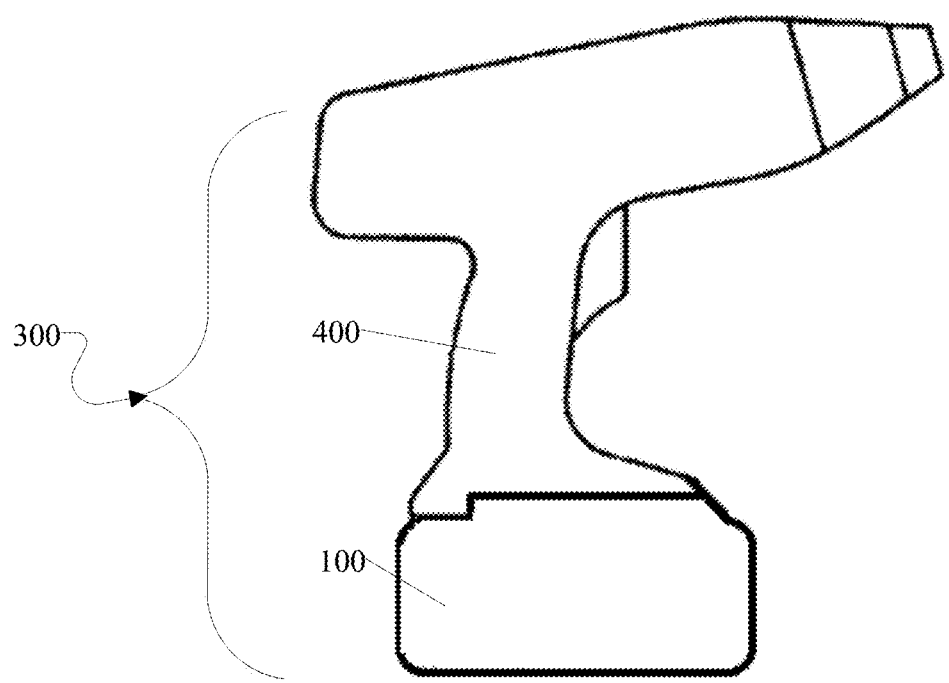
FIG. 6 is a non-limiting example of an apparatus according to an example embodiment of this disclosure.
Figure 9:
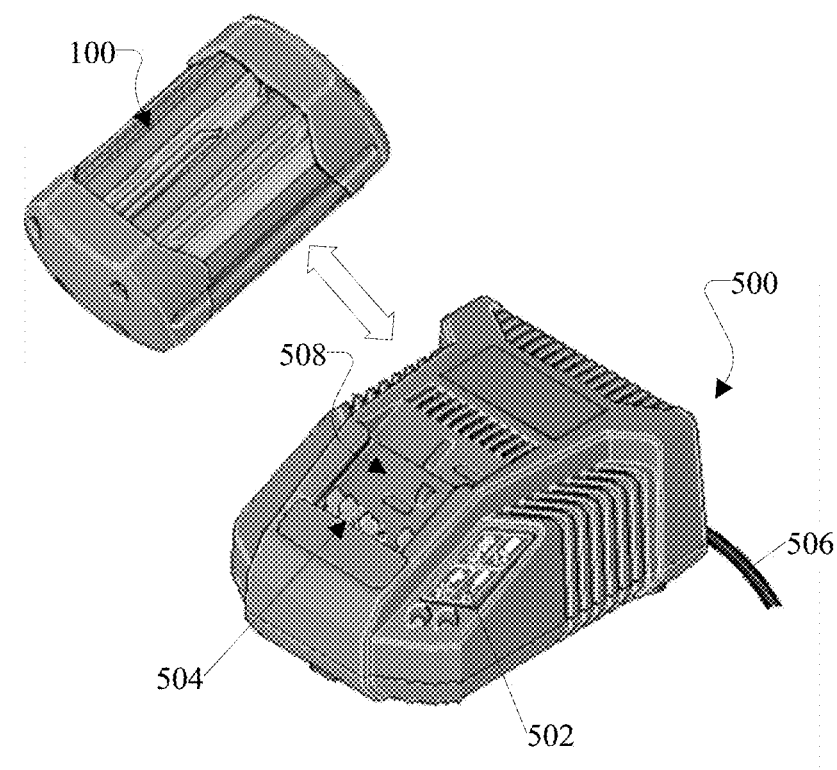
FIG. 9 is an example of a battery charger for a battery according to an example embodiment of this disclosure.

In an example embodiment, the battery 100 includes an interface 106, which is configured to connect to and engage with an electrical device (e.g., battery-powered device, battery charger, etc.). In an example embodiment, for instance, the interface 106 is configured to electrically connect to and mechanically engage with a corresponding interface on a bottom portion of a power tool 400, as shown in FIG. 6, and also a corresponding interface on an upper portion of a battery charger 500, as shown in FIG. 9. In an example embodiment, the interface 106 is provided on at least one side of the battery 100. For example, in FIG. 1, the interface 106 is provided at least on a top or upper side of the battery 100.

In an example embodiment, the interface 106 includes at least a first part 108 and a second part 110. In an example embodiment, the first part 108 and the second part 110 are adjacent to each other. By being positioned in this manner, the first part 108 and the second part 110 are structured to be spaced from each other in one scenario and in contact with each other in another scenario. More specifically, in an example embodiment, the first part 108 and the second part 110 are configured to be spaced from each other by a gap 112, as shown in FIGS. 1, 3, 5, and 7. As shown, the gap 112 provides an electrical and a mechanical separation between the first part 108 and the second part 110. In addition, the first part 108 and the second part 110 are configured to be in contact or in close proximity to each other such that an electrical connection is established between each electrical contact 118 on the first part 108 and each electrical contact 120 on the second part 110, as shown in FIGS. 2, 4, and 8.

In an example embodiment, the first part 108 includes at least one electrical contact 118 on a side of the first part 108 that faces a side of the second part 110. In an example embodiment, each electrical contact 118 is fixed, secured, attached, and/or connected to the first part 108. In this regard, the first part 108 includes any suitable number of electrical contacts 118 based on various factors, such as the number of battery modules 138, the number of battery cells 132, the battery configuration, the number of electrical contacts 120 on the second part 110, and/or any relevant considerations. For instance, in FIG. 1, the first part 108 includes three electrical contacts 118, which are spaced from each other along one side of the first part 108.

In an example embodiment, the second part 110 includes at least one electrical contact 120 on a side of the second part 110 that faces a side of the first part 108. In an example embodiment, each electrical contact 120 is fixed, secured, attached, and/or connected to the second part 110. In this regard, the second part 110 includes any suitable number of electrical contacts 120 based on various factors, such as the number of battery modules 138, the number of battery cells 132, the battery configuration, the number of electrical contacts 118 on the first part 108, and/or any relevant considerations. For instance, in FIG. 1, second part 110 includes three electrical contacts 120, which are spaced from each other along one side of the second part 110.

In an example embodiment, the battery 100 includes at least one locking member 116 in any suitable location. For example, in FIG. 1, the battery 100 includes at least one locking member 116 on a top or upper surface of the first part 108. In an example embodiment, the locking member 116 is any suitable locking mechanism that is configured to lock onto a corresponding locking member 404 (e.g., a locking arm or clamp) on an electrical device (e.g., power tool 400). For example, in FIG. 1, the first part 108 includes one large locking member 116, which includes an angled, tapered recess portion and two small locking members 116, which includes angled, tapered recess portions. In this example, the two small locking members 116 are positioned adjacent to the large locking member 116. As shown in FIG. 1, these plurality of locking members 116 are structured such that the battery 100 is enabled to establish a secure hold and locking relationship with the electrical device.

In an example embodiment, when the locking member 116 of the battery 100 is in a locked state with the locking member 404 of the electrical device, then the battery 100 is securely attached, connected, and locked onto the electrical device (e.g., power tool 400), as shown in FIG. 8. In an example embodiment, when in this locked state, the battery 100 is engaged with the electrical device such that there is no gap 112 between the second part 110 and the first part 108. Also, in this locked state, the battery 100 is configured to provide maximum power to an electrical device, as there is an electrical connection between the battery modules 138 via each electrical contact 118 of the first part 108 and each electrical contact 120 of the second part 110. Alternatively, when the locking member 116 is not in a locked state (i.e., an unlocked state) with the locking member 404, then the battery 100 is not securely attached, connected, and locked onto the electrical device (e.g., power tool 400). In this unlocked state with respect to the electrical device (e.g., power tool 400), the battery 100 is detachable or already detached from the electrical device (e.g. power tool 400), as shown in at least FIGS. 1, 5, and 7. In an example embodiment, when the battery 100 is not connected and secured to the electrical device, then the battery 100 is in a safe transportation mode in which there is an electrical disconnect between the battery modules 138 via a separation between each electrical contact 118 of the first part 108 and each electrical contact 120 of the second part 110.

In an example embodiment, the battery 100 includes an electrical connection section 140 in any suitable location. For example, in FIG. 1, the second part 110 includes the electrical connection section 140. In an example embodiment, the electrical connection section 140 includes at least a first electrical terminal 122 and a second electrical terminal 122. In this regard, the first electrical terminal 122 is a positive terminal (cathode) and the second electrical terminal 122 is a negative terminal (anode), or vice versa. The first and second electrical terminals 122 are configured to provide an electrical connection from the battery 100 (or at least one battery module 138) to an electrical device (e.g., a compatible power tool 400, a compatible battery charger 500, etc.). Also, in an example embodiment, the electrical connection section 140 includes a signal terminal 124, which provides signals relating to a thermistor, any suitable electrical/electronic component, or the like.

In an example embodiment, the battery 100 includes at least one guide 126 in any suitable location. For example, as shown in at least FIGS. 1-2, the battery 100 includes at least one guide 126 on sides of the first part 108 and at least one guide 126 on sides of the second part 110. In an example embodiment, the guide 126 is structured to guide, direct, and/or steer the battery 100 into proper position with respect to a compatible electrical device and/or compatible battery charger. In an example embodiment, the guide 126 is configured to engage with a guide member (not shown), which is on a compatible electrical device and/or compatible battery charger. This feature is advantageous in ensuring that the battery 100 is properly aligned such that an electrical connection can be made via the electrical connection section 140 of the battery 100 with a corresponding electrical connection section 406/504 of an electrical device (e.g., power tool 400, battery charger 500, or the like).

In an example embodiment, the battery 100 includes a battery status indicator 114 in any suitable location. For example, in FIG. 1, the battery status indicator 114 is disposed on a front, upper side of the battery 100. More specifically, in FIG. 1, for instance, the battery status indicator 114 is adjacent, connected, and/or integral with the first part 108. Alternatively, the battery status indicator 114 can be separate from the first part 108. In an example embodiment, the battery status indicator 114 includes any relevant status data pertaining to the battery 100. In this regard, according to an example embodiment, the battery status indicator 114 is in communication with at least the battery monitoring module. For example, the battery status indicator 114 is configured to display a battery power level of the battery 100. In this regard, for instance, the battery status indicator 114 is configured to indicate at least a fully-charged state, a partially-charged state, or a not-charged state of the battery 100. As another example, the battery status indicator 114 is configured to display temperature data relating to the battery 100. In an example embodiment, the battery status indicator 114 includes a status indicator to indicate a status of each battery module 138. Also, in an example embodiment, the battery status indicator 114 includes a status indicator to indicate a connection among all of the plurality of battery cells 132 via electrical contacts 118 and 120, or a disconnection among all of the plurality of battery cells 132 via electrical contacts 118 and 120, thereby being advantageous in instances in which it is difficult to view the electrical contacts 118, the electrical contacts 120, the position of the movable part (e.g., the second part 110) in relation to the fixed part, and/or or any combination thereof. Accordingly, the battery status indicator 114 is advantageous in providing the user with current status information pertaining to the battery 100 so that the user can, for example, use, manipulate, or recharge the battery 100, as desired or needed.

FIGS. 3-4 are cross-sectional views of a side of the battery 100 according to an example embodiment. In an example embodiment, the battery 100 includes a plurality of battery modules 138. In this regard, the battery 100 includes two or more battery modules 138. For example, in the non-limiting example shown in FIGS. 3-4, the battery 100 includes at least a first battery module 138 and a second battery module 138. In an example embodiment, each battery module 138 includes at least one battery cell 132. For example, in FIGS. 3-4, the first battery module 138 includes at least two battery cells 132, which are electrically connected to each other in series, in parallel, or both in series and in parallel. In an example embodiment, to provide these electrical connections, the first battery module 138 includes at least one corresponding first connector 134, which connects each battery cell 132 in the desired configuration (e.g., series or parallel) for the battery 100. In an example embodiment, the first battery module 138 is also connected to at least one electrical contact 118 via at least one first connector 134. In this regard, the first connector 134 can include one or more electrical connection components. Also, in FIGS. 3-4, the second battery module 138 includes at least two battery cells 132, which are electrically connected to each other in series, in parallel, or both in series and in parallel. In an example embodiment, to provide these electrical connections, the second battery module 138 includes at least one corresponding second connector 136, which connects each battery cell 132 in the desired configuration (e.g., series or parallel) for the battery 100. In an example embodiment, the second battery module 138 is also connected to at least one electrical contact 120 via at least one second connector 136. In this regard, the second connector 136 can include one or more electrical connection components.

In an example embodiment, the movable part (e.g., the second part 110) is configured to move away from the fixed part (e.g., the first part 108) in a first direction 200 and into a first position. In this case, when the second part 110 is in the first position, then each electrical contact 120 of the second part 110 is separated from a corresponding electrical contact 118 of the first part 108 by the gap 112 to provide an electrical disconnection state between the battery modules 138. In addition, the movable part (e.g., the second part 110) is configured to move towards the fixed part (e.g., the first part 108) in a second direction 202 and into a second position. In this case, when the second part 110 is in the second position, then each electrical contact 120 of the second part 110 establishes an electrical connection with a corresponding electrical contact 118 of the first part 108 to provide an electrical connection state between the battery modules 138. When there is an electrical connection, then all of the plurality of battery cells 132 are connected together and the battery 100 can provide its maximum power output. Also, in this state, all of the plurality of battery cells 132 are configured to be charged simultaneously via a battery charger 500 during a battery charging operation.

Figure 5:
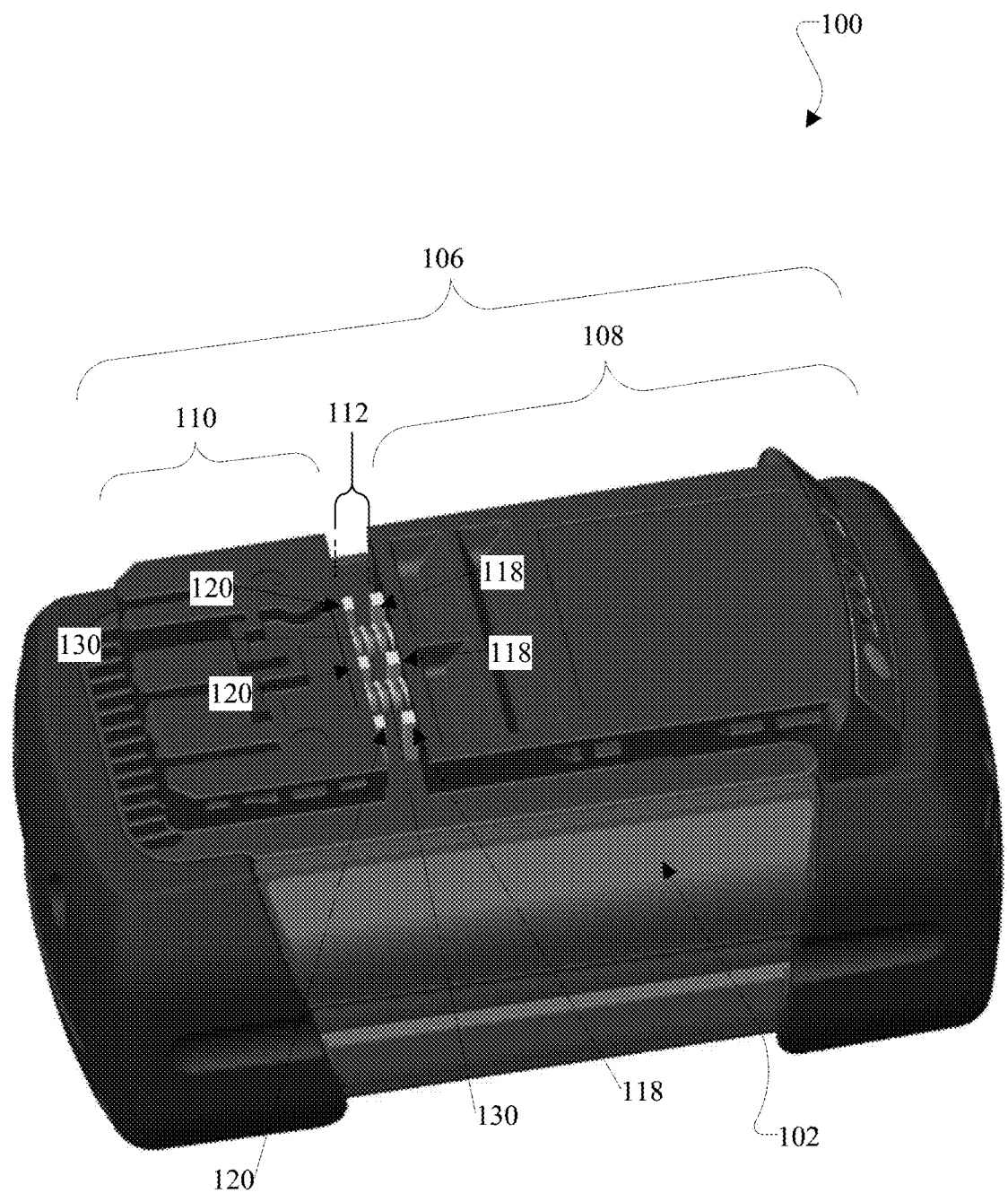
FIG. 5 is a perspective view of an example implementation of a mechanism that provides the first and second states of a battery according to an example embodiment of this disclosure.

FIG. 5 is a perspective view of one implementation of the mechanism that enables an electrical connection state and an electrical disconnection state among the plurality of battery modules 138 within the battery 100 according to an example embodiment. More specifically, the mechanism is configured to provide an electrical connection between the electrical contacts 118 and 120 and an electrical separation between the electrical contacts 118 and 120. In an example embodiment, the mechanism can be positioned in any suitable location of the battery 100. For example, in an example embodiment, the mechanism is provided on the interface 106 at a top or upper portion of the battery 100. As one implementation, the mechanism includes a fixed part and a movable part. For example, in FIG. 5, the first part 108 is a fixed part and the second part 110 is a movable part. In this example, the second part 110 is movable along at least one axis (e.g., longitudinal axis) of the battery 100. In this regard, the second part 110 is configured to move in at least a first direction 200 and a second direction 202 along at least one axis of the battery 100.

In an example embodiment, the battery 100 is configured such that there is an electrical disconnect among the plurality of battery cells 132 by default (e.g., when the battery 100 is not engaged with an electrical device), thereby being electrically configured to provide a lower energy capacity and lower voltage state for safe handling and transport. To achieve this first state with a lower energy capacity and a lower voltage than that of the second state by default, in one implementation, the battery 100 includes at least one spring 130 or the like. In an example embodiment, each spring 130 can be positioned in any suitable location with respect to the first part 108 and the second part 110 provided that each spring 130 is enabled to establish or assist in establishing a first state (e.g., an electrical separation between each electrical contact 118 of the first part 108 and each electrical contact 120 of the second part 110) and a second state (e.g., electrical connection between each electrical contact 118 of the first part 108 and each electrical contact 120 of the second part 110). More specifically, as shown in FIG. 5, the battery 100 includes a plurality of springs 130, which are disposed in a space between the first part 108 and the second part 110. In this example, the plurality of springs 130 are spaced apart from each other along a lateral axis, which is perpendicular to the longitudinal axis of the battery. In addition, each of the plurality of springs 130 includes an end portion that abuts against a side of the first part 108 and an opposite end portion that abuts against a side of the second part 110. Also, as shown in FIG. 5, each spring 130 is spaced from each of the electrical contacts 118/120 along a lateral direction such that there is no interference between each spring 130 and each of the electrical contacts 118/120.

In an example embodiment, each spring 130 is configured to be in a non-compressed state and a compressed state. For example, in FIG. 5, by default, each spring 130 is configured to be in a non-compressed state when the battery 100 is not engaged with an electrical device (e.g., battery-powered device, battery charger, etc.). In this regard, for instance, when achieving a non-compressed state, each spring 130 is configured to move the second part 110 away from the first part 108 in the first direction 200 such that a predetermined gap 112 is created that electrically separates each electrical contact 118 of the first part 108 with each electrical contact 120 of the second part 110. This electrical separation advantageously provides a safe handling and transportation mode for the battery 100 since the energy capacity becomes less than a desired level (e.g., less than 100 WAh for safe transport).

In addition, each spring 130 is configured to be in a compressed state when the battery 100 is engaged with an electrical device or battery charger. In this regard, for instance, when achieving a compressed state, the second part 110 moves in accordance with an applied force (e.g., force applied via a part of the electrical device or the like) towards the first part 108 in the second direction 202 such that each spring 130 is compressed and an electrical connection is established between each electrical contact 118 of the first part 108 and each electrical contact 120 of the second part 110. This electrical connection advantageously provides the battery 100 with the configuration and ability to supply a relatively high amount of power to an electrical device since the energy capacity becomes equal to or greater than a desired level (e.g., equal to or greater than 100 WAh as needed by an electrical device such as a power tool).

FIG. 6 is a non-limiting example of an apparatus 300 according to an example embodiment. In an example embodiment, the apparatus 300 includes any suitable electrical device along with the battery 100. In this regard, the electrical device can be any battery-operated, battery-driven, or battery-powered device. As a non-limiting example, the electrical device is a power tool 400, such as a grinder, a saw, a planning machine, a screwdriver, any suitable handheld electrical tool, etc. For instance, in FIG. 6, the power tool 400 is a power drill, which is configured to include the battery 100 for operation. In an example embodiment, the battery 100 is configured to attach to and detach from the power tool 400. In FIG. 6, the battery 100 attaches to and detaches from a base of the power tool 400. In other embodiments, the battery 100 is configured to attach to and detach from any suitable location of the electrical device.

In an example embodiment, when the battery 100 is attached to the power tool 400 and in proper position, then the battery 100 is fully engaged with the power tool 400. In this regard, when the battery 100 is fully engaged with the power tool 400, then the power tool 400 is enabled to connect to and utilize battery power from the battery 100. Alternatively, when the battery 100 is not attached to the power tool 400 and/or not in proper position, the battery 100 is not fully engaged with the power tool 400. In this regard, when the battery 100 is not fully engaged with the power tool 400, then the power tool 400 is not able to connect to and utilize battery power from the battery 100.

Figure 7:
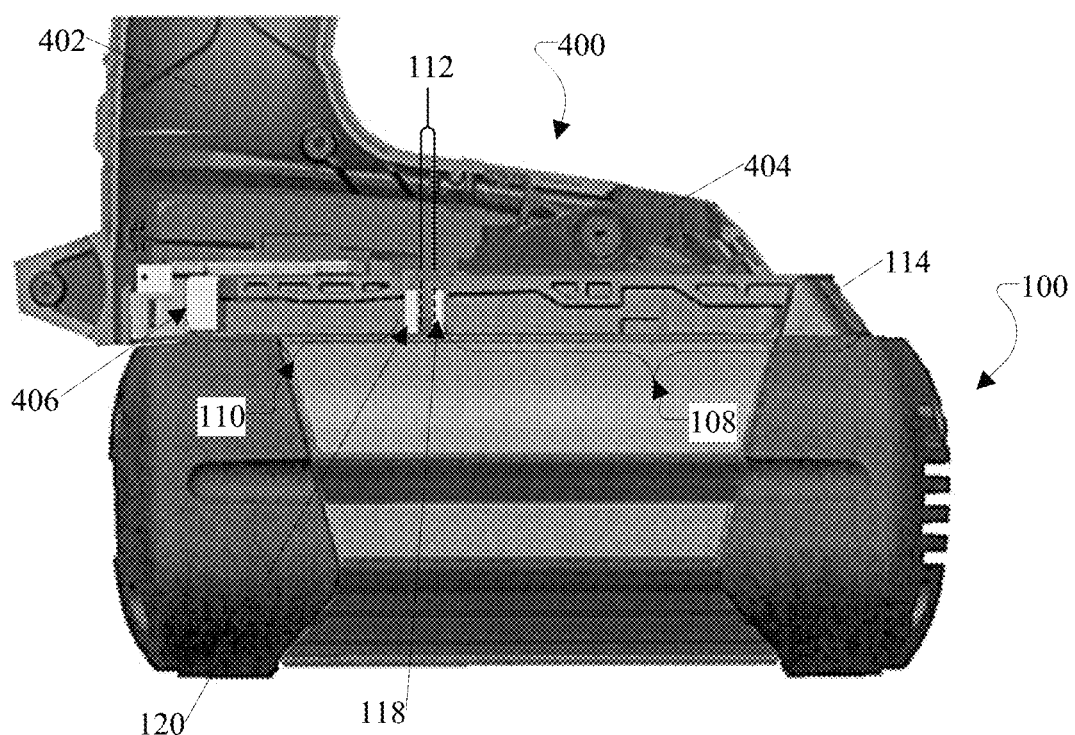
FIG. 7 is an example of a battery that is not fully engaged with a power tool according to an example embodiment of this disclosure.
Figure 8:
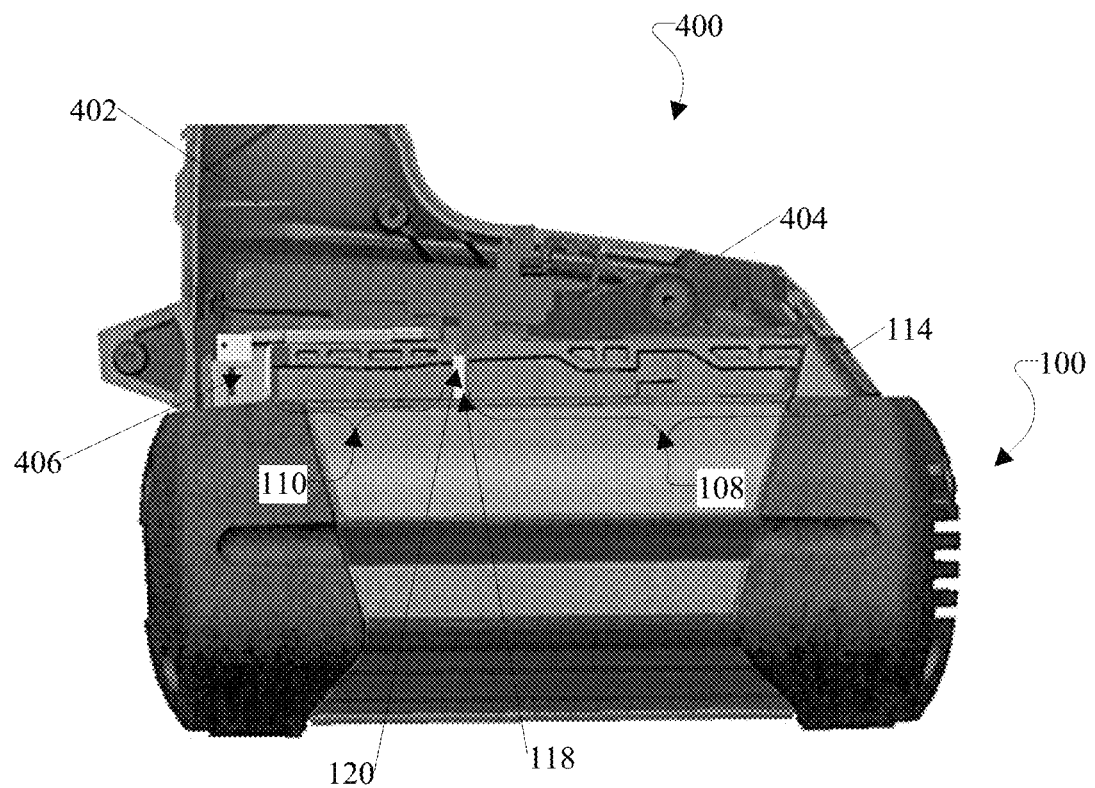
FIG. 8 is an example of a battery that is engaged with a power tool according to an example embodiment of this disclosure.

FIG. 7 is an example of a battery 100 that is not fully engaged with the power tool 400 according to an example embodiment. More specifically, in this example, the power tool 400 includes a housing 402 with a locking member 404 and an electrical connection section 406. As shown in FIG. 7, in this instance, the battery 100 is being guided into the power tool 400 via guides 126, but is not fully engaged with the power tool 400. That is, in FIG. 7, the electrical connection section 140 of the battery 100 is not fully engaged with the electrical connection section 406 of the power tool 400. Also, in FIG. 7, the locking members 116 and 404 are not in a locked state with each other. In addition, the second part 110 has not yet reached the second position and thus the gap 112 is still present between the second part 110 and the first part 108, thereby maintaining the electrical disconnection state (e.g., lower energy capacity state) of the battery 100.

FIG. 8 is an example of a battery 100 that is fully engaged with the power tool 400 according to an example embodiment. More specifically, as shown in FIG. 8, in this instance, the battery 100 has been guided into the power tool 400 via guides 126, and is also fully engaged with the power tool 400. That is, in FIG. 8, the electrical connection section 140 of the battery 100 is fully engaged with and connected to the electrical connection section 406 of the power tool 400. Also, in FIG. 8, the locking members 116 and 404 are in a locked state with each other. In addition, the second part 110 has moved towards the first part 108 and into the second position such that the gap 112 is eliminated, thereby achieving an electrical connection state (e.g., higher energy capacity state) of the battery 100 and also achieving an electrical connection with the power tool 400.

FIG. 9 is a non-limiting example of a battery charger 500 for the battery 100 according to an example embodiment. In an example embodiment, the battery charger 500 includes a battery charging circuit, a fast battery charging circuit, or a combination thereof to charge the plurality of battery cells 132, the plurality of battery modules 138, and/or the battery 100. In an example embodiment, the battery charger 500 is configured to receive the battery 100 in a battery holder 508 and provide an electrical connection section 504 (with electrical contacts or pins) that connects to the electrical connection section 140 (e.g., electrical terminals 122) of the battery 100 for charging. In addition, the battery charger 500 includes various other features, such as a suitable connection 506 to a power source (e.g., power outlet), a status indicator 502 relating to a battery charging state of the battery, etc. Furthermore, when the battery 100 is engaged with or being charged by the battery charger 500, each electrical contact 120 of the second part 110 is electrically connected to each electrical contact 118 of the first part 108. For example, when in a charging state, the battery 100 has its second part 110 in contact or substantially in contact with the first part 108 to enable the electrical connection between the electrical contacts 118 and 120. Also, in an example embodiment, when the battery 100 includes at least one spring 130, as shown in FIG. 5, then each spring 130 is in a compressed state 108 to enable the electrical connection between the electrical contacts 118 and 120. In this regard, the battery charger 500 can include a battery holder 508, which is inclined or the like, to enable the weight of the battery 100 to force, push, hold, or cause the second part 110 (and/or each spring 130) to move or to be positioned such that the electrical contacts 118 and 120 are in contact with each other while the battery 100 is charging. Additionally or alternatively, the battery charger 500 can include any suitable mechanical structure, which forces, pushes, holds, or the causes the second part 110 (and/or each spring 130) to move or to be positioned such that the electrical contacts 118 and 120 are in contact with each other while the battery 100 is charging.

As described above, the battery 100 includes a number of advantageous features and benefits. For example, the battery 100 is configured to provide a greater amount of power and/or capacity when properly engaged with an electrical device and a lesser amount of power and/or capacity when not properly engaged with the electrical device. In this regard, the battery 100 is enabled to provide an electrical disconnect among the plurality of battery cells 132 (and/or the battery modules 138) of the battery 100 to provide a lower voltage and potential, thereby providing a safe transportation mode for the battery 100. In addition, the battery 100 is enabled to provide an electrical connection among the plurality of battery cells 132 (and/or the battery modules 138) of the battery 100 in accordance with a position of the second part 110 relative to the first part 108 and/or an applied force (e.g., force needed to move the movable part) to provide a higher voltage and potential, thereby providing sufficient power and/or full charging capability in connection with a compatible electrical device. In addition, with such a mechanism, the battery 100 provides a user with the ability to detect in a quick manner via visual inspection whether the battery 100 is connected in a manner that provides a higher voltage and potential, or disconnected in a manner that provides a lower voltage and potential. Furthermore, with such a mechanism and configuration, the battery 100 provides an interface 106, which is structurally compatible and configured to engage with existing electrical devices (e.g., battery-powered device, a battery charger, or the like).

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A battery comprising:
   a housing;
   a plurality of battery cells disposed in the housing;
   a first part with a first contact, the first contact electrically connected to at least one battery cell of the plurality of battery cells; and
   a second part with a second contact, the second contact electrically connected to at least one battery cell of the plurality of battery cells;
   wherein the second part and second contact are repeatably movable between (a) a first position whereat the second contact and the first contact are physically and electrically separated so as to disconnect the plurality of battery cells and (b) a second position whereat the second contact and the first contact are physically and electrically connected so as to connect the plurality of battery cells together;
   wherein the battery is movable between (a) a connected position in which the battery is fully engaged with an electrical device and (b) a disconnected position in which the battery is not fully engaged with the electrical device; and
   wherein the battery is configured so that moving the battery between the connected position and the disconnected position causes the second part and second contact to move between the second position and the first position, respectively, such that the plurality of battery cells are connected when the battery is in the connected position and are disconnected when the battery is in the disconnected position;
   wherein the second part further comprises a battery terminal via which, in the connected position, the first and second contacts are electrically connected to the electrical device.

2. The battery of claim 1, wherein the second part includes an electrical connection section that includes at least a positive terminal of the battery and a negative terminal of the battery.

3. The battery of claim 1, wherein:
   when the second part is in the first position, the battery has a low energy capacity; and
   when the second part is in the second position, the battery has a high energy capacity, the high energy capacity being greater than the low energy capacity.

4. The battery of claim 1, wherein the plurality of battery cells are lithium-based battery cells.

5. The battery of claim 1, wherein:
   the plurality of battery cells is organized into at least a first battery module and a second battery module;
   the first battery module includes the first connection and at least two battery cells; and
   the second battery module includes the second connection and at least two battery cells.

6. The battery of claim 1, further comprising:
at least one locking member that is configured to establish a locking relationship with a locking member of the electrical device;
wherein, establishing the locking relationship between the locking member of the battery and the locking member of the electrical device causes the battery to move to the connected position, such that the second part is in the second position when the battery establishes a locking relationship with the electrical device.

7. The battery of claim 1, further comprising:
at least one spring including:
a first end portion operatively engaged with a portion of the first part spaced apart from the first contact; and
a second end portion operatively engaged with a portion of the second part spaced apart from the second contact;
wherein the at least one spring is configured to bias the second part toward the first position.

8. An apparatus comprising:
an electrical device; and
a battery including:
a housing;
a plurality of battery cells disposed in the housing;
a first part with a first contact, the first contact electrically connected to at least one battery cell of the plurality of battery cells; and
a second part with a second contact, the second contact electrically connected to at least one battery cell of the plurality of battery cells;
wherein the second part and second contact are repeatably movable between (a) a first position whereat the second contact and the first contact are physically and electrically separated so as to disconnect the plurality of battery cells and (b) a second position whereat the second contact and the first contact are physically and electrically connected so as to connect the plurality of battery cells together;
wherein the battery is movable between (a) a connected position in which the battery is fully engaged with the electrical device and (b) a disconnected position in which the battery is not fully engaged with the electrical device; and
wherein the battery is configured so that moving the battery between the connected position and the disconnected position causes the second part and second contact to move between the second position and the first position, respectively, such that the plurality of battery cells are connected when the battery is in the connected position and are disconnected when the battery is in the disconnected position;
wherein the second part further comprises a battery terminal via which, in the connected position, the first and second contacts are electrically connected to the electrical device.

9. The apparatus of claim 8, wherein:
the second part includes an electrical connection section that includes at least a positive terminal of the battery and a negative terminal of the battery;
the electrical connection section of the second part is configured to electrically connect to an electrical connection section of the electrical device.

10. The apparatus of claim 8, wherein:
when the second part is in the first position, the battery has a low energy capacity; and
when the second part is in the second position, the battery has a high energy capacity, the high energy capacity being greater than the low energy capacity.

11. The apparatus of claim 8, wherein the plurality of battery cells are lithium-based battery cells.

12. The apparatus of claim 8, wherein:
the plurality of battery cells is organized into at least a first battery module and a second battery module;
the first battery module includes the first connection and at least two battery cells; and
the second battery module includes the second connection and at least two battery cells.

13. The apparatus of claim 8, further comprising:
at least one locking member that is configured to establish a locking relationship with a locking member of the electrical device;
wherein establishing the locking relationship between the locking member of the battery and the locking member of the electrical device causes the battery to move to the connected position, such that the second part is in the second position when the battery establishes a locking relationship with the electrical device.

14. The apparatus of claim 8, wherein the electrical device is a battery-powered device or a battery charger.

15. The apparatus of claim 8, wherein the battery further includes:
at least one spring having:
a first end portion operatively engaged with a portion of the first part spaced apart from the first contact; and
a second end portion operatively engaged with a portion of the second part spaced apart from the second contact;
wherein the at least one spring is configured to bias the second part toward the first position.

16. The apparatus of claim 8, wherein the housing includes an interface side from which the first and second parts project, and the second part moves laterally across the interface side when moved between the first and second positons.

17. A battery comprising:
a housing;
a plurality of battery cells disposed in the housing;
a first part with a first contact, the first contact electrically connected to at least one battery cell of the plurality of battery cells; and
a second part with a second contact, the second contact electrically connected to at least one battery cell of the plurality of battery cells;
wherein the second part and second contact are repeatably movable between (a) a first position whereat the second contact and the first contact are physically and electrically separated so as to disconnect the plurality of battery cells and (b) a second position whereat the second contact and the first contact are physically and electrically connected so as to connect the plurality of battery cells together;
wherein the battery is movable between (a) a connected position in which the battery is fully engaged with an electrical device and (b) a disconnected position in which the battery is not fully engaged with the electrical device; and
wherein the battery is configured so that moving the battery between the connected position and the disconnected position causes the second part and second contact to move between the second position and the first position, respectively, such that the plurality of battery cells are connected when the battery is in the connected position and are disconnected when the battery is in the disconnected position;

wherein the housing includes an interface side from which the first and second parts projection, and the second part moves laterally across the interface side when moved between the first and second positions.

* * * * *